United States Patent [19]

Van Praag

[11] 3,883,087
[45] May 13, 1975

[54] FILM TAKE-UP REEL
[76] Inventor: Clifford Van Praag, 264 Dennis St., Oceanside, N.Y. 11572
[22] Filed: Feb. 23, 1973
[21] Appl. No.: 335,107

[52] U.S. Cl. ................................................. 242/71.8
[51] Int. Cl. ............................................. B65h 75/18
[58] Field of Search............ 242/71.8, 71.8 A, 71.9, 242/73, 77, 77.2, 77.3, 77.4, 118.4, 71.1; 197/175

[56] References Cited
UNITED STATES PATENTS

| 2,051,334 | 8/1936 | Goldberg | 242/71.8 A |
| 2,061,177 | 11/1936 | Tasker | 242/71.2 |
| 2,190,013 | 2/1940 | Byers | 242/118.4 |
| 2,728,530 | 12/1955 | Goldberg et al. | 242/71.8 A |
| 3,601,336 | 8/1971 | Preston | 242/68.3 |

FOREIGN PATENTS OR APPLICATIONS

| 346,737 | 10/1929 | United Kingdom | 242/71.8 A |

Primary Examiner—John W. Huckert
Assistant Examiner—John M. Jillions
Attorney, Agent, or Firm—Eric H. Waters

[57] ABSTRACT

A take-up reel for motion picture film and the like including a hub structure formed of a complementary pair of sheet-metal components, a ball bearing assembly fastened to each hub component, and reel side discs being mounted on each ball bearing assembly so as to be rotatable relative to the hub structure in freewheeling relationship therewith.

8 Claims, 6 Drawing Figures

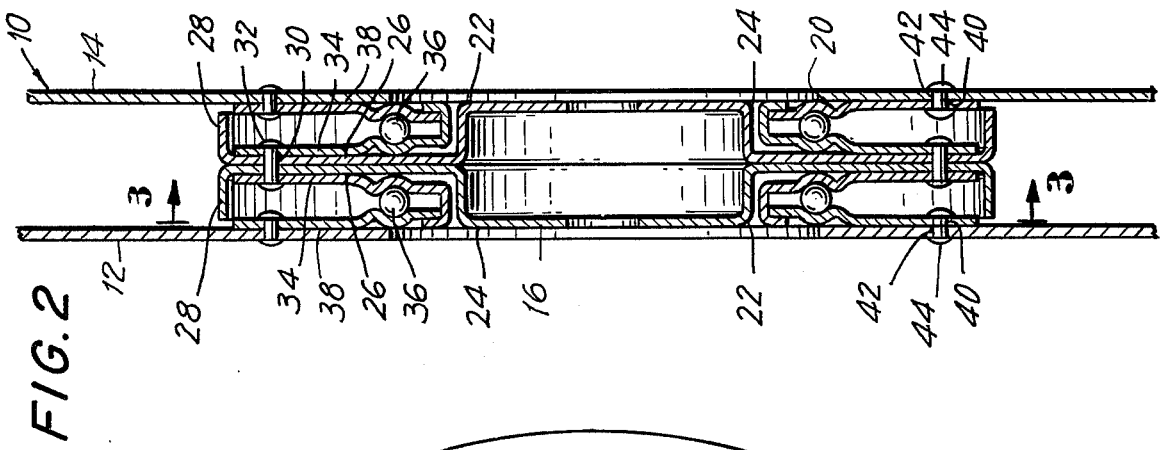
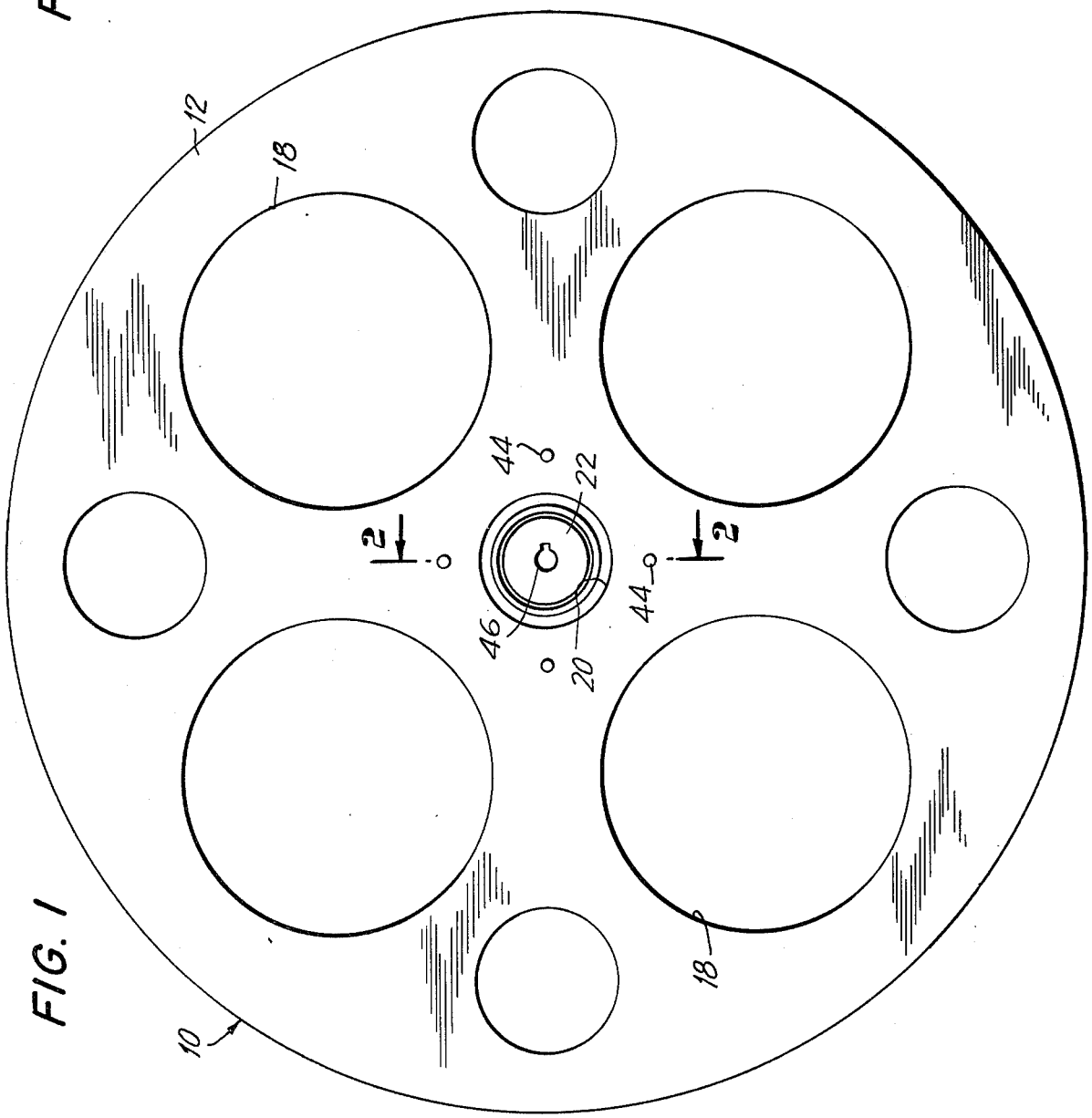

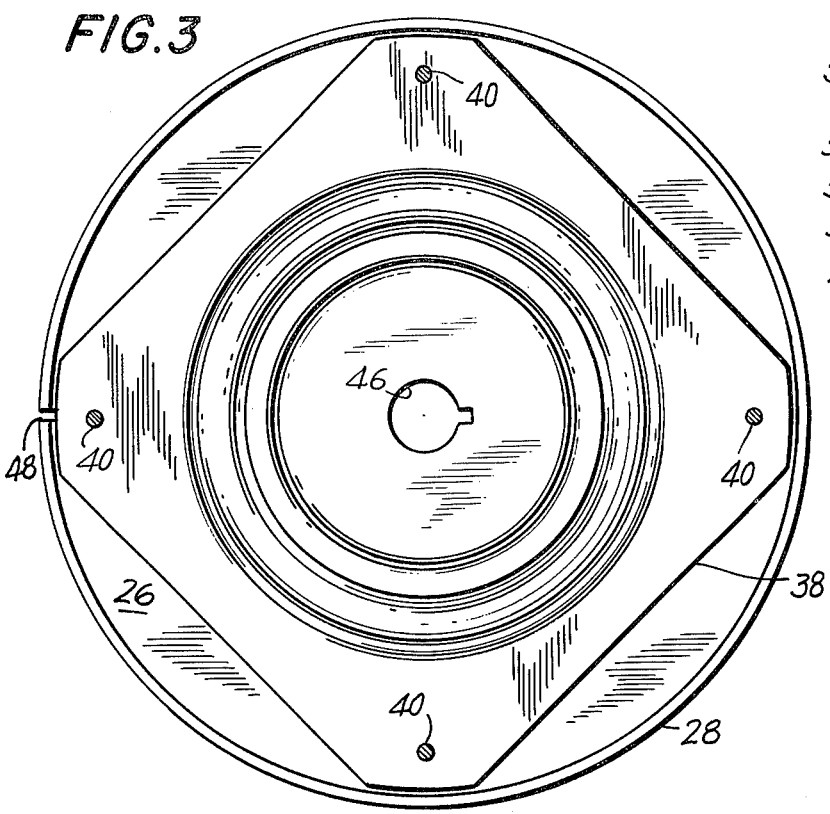
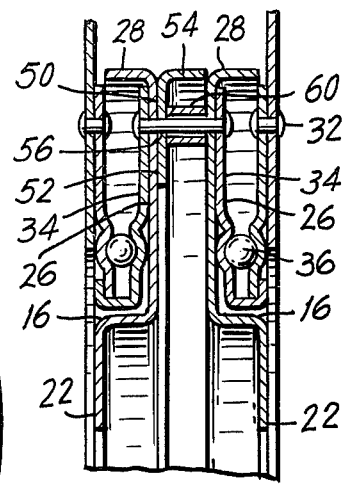
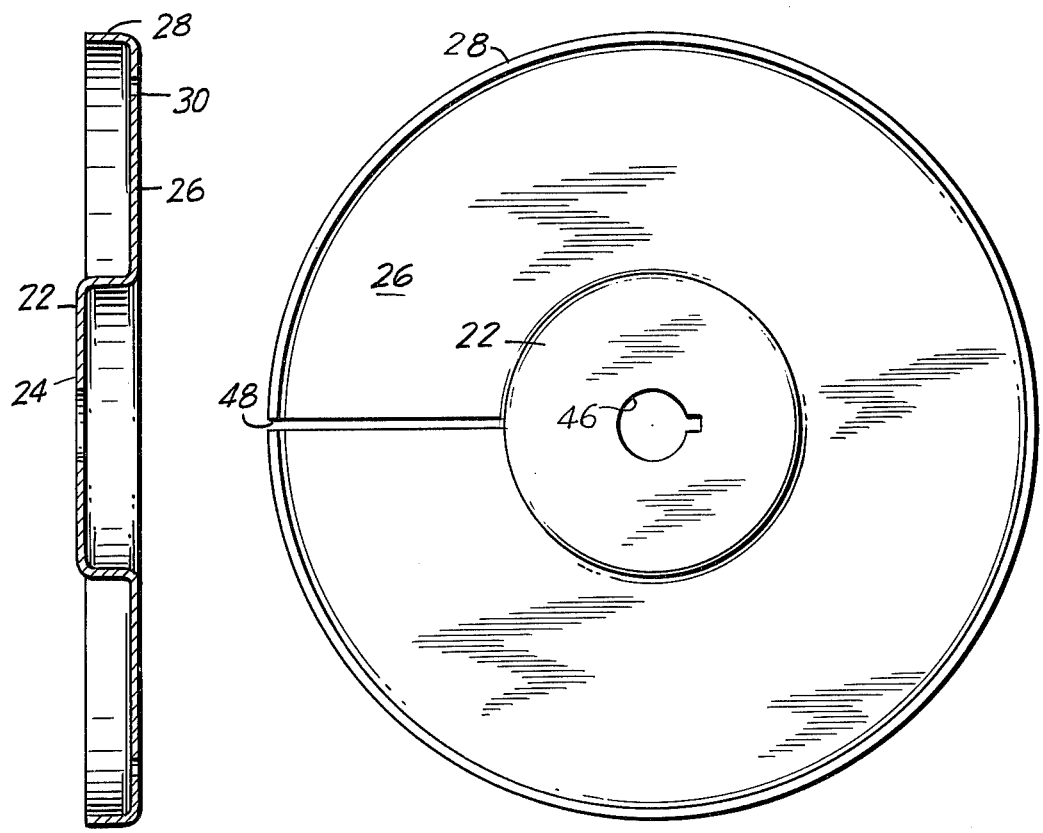

FILM TAKE-UP REEL

FIELD OF THE INVENTION

The present invention relates generally to reels and, more particularly, to an improved motion picture film take-up reel having free-wheeling side flange discs.

DISCUSSION OF THE PRIOR ART

Various types and constructions of motion picture film take-up reels are presently available, including reels having hub portions for receiving the film and adapted to be mounted onto a reel drive spindle, and with the hub portion being rotatable relative to the reel side flanges or discs, the latter of which maintain the film in a predetermined axial relationship during winding or unwinding on the hub. Most of the prior art film reel structures which have hubs rotatable with respect to the reel side discs or flanges utilize a friction or slide clutch arrangement. This, in essence, upon initiating winding of the film onto film reel, will permit the hub portion to commence rotation together with the film disposed about the peripheral surface thereof, while the much heavier reel side discs will initially remain stationary in view of their large inherent inertial loads so as to only gradually commence rotation until their rotational speed corresponds to that of the hub portion. Consequently, this will avoid the imposition of extremely high tensile forces to the film strip generally evinced in overcoming the heavy inertial loads of the discs, thereby reducing the danger of tearing of the motion picture film strip during starting of reel rotation. However, although the prior art film reels of this type have proven to be satisfactory in operation by avoiding or reducing the initial tensile forces imparted to the film strip in view of the inertial loads of the heavy reel side discs, presently employed motion picture film reels having essentially "free-wheeling" side flange or discs which are rotatable relative to the central hub portion of the reel, the reels are relatively complex to manufacture and service so as to render these expensive from a commercial standpoint.

Furthermore, presently known motion picture film reels of the type described are generally quite heavy and cumbersome since they basically utilize steel as the material for most of their major components, such as the hubs and large reel side discs. Additionally, prior art motion picture film reels are restricted for use with one specific size or width of film, and cannot be employed in an interchangeable relationship with respect to film strips having different widths.

SUMMARY OF THE INVENTION

It is accordingly an objection of the present invention to obviate the drawbacks and disadvantages encountered in presently known motion picture film reels by providing a novel and unique film reel having essentially free-wheeling side discs or flanges which are rotatable relative to a central reel hub portion upon which the motion picture film is adapted to be wound, and wherein all of the major reel components are of a light-weight construction adapted to be assembled and disassembled in a simple and expedient manner.

It is another object of the present invention to provide a motion picture film reel having freely rotatable side discs which may be readily constructed from preformed sheet-metal components and commercially available materials.

Still another object of the present invention is to provide a motion picture film reel having the major reel components constructed of extremely light-weight materials and adapted to be assembled without the need for special assembling tools or equipment.

Yet another object of the present invention is to provide a motion picture film reel of the type described adapted to be manufactured with interchangeable and replaceable components so as to be adjustable for use with motion picture film strips of varying widths.

In essence, the inventive motion picture film reel includes a pair of complementarily shaped hub portions together forming a central hub and a radially extending annular flange structure extending at its outer radius into cylindrical axially diverging flange portions forming a contiguous coplanar cylindrical surface adapted to have a strip of motion picture film wound thereon. The central hub portions are adapted to be fastened together in conjunction with the adjacent flanges of a pair of roller bearings positioned one on each side of the hub, having each a pair of parallel spaced flanges, and central apertures adapted to slip over the radially inner central portion of the hub. The outer axially spaced apart flanges of each of the roller bearings are, in turn, adapted to be fastened through suitable fasteners, such as screws, bolts or rivets, to circular reel side flanges or discs which cooperatively retain the motion picture film strip in laterally controlled relationship relative to the outer annular cylindrical flange of the hub member as the film is being wound upon or unwound from the film reel. Since the inner and outer axially spaced flanges of each of the ball bearings are rotatable relative to each other, the respective reel side discs fastened thereto are also rotatable relative to the inner portion of the film reel, in effect, the hub portion, relative to each other so as to form free-wheeling side flanges or discs for the film reel.

In another advantageous embodiment of the present invention, in order to provide an interchangeable structure adapted to accommodate various film width sizes while utilizing the basic hub, ball bearing and reel side disc components, there may readily be inserted an intermediate annular spacer between the two complementary or mating halves of the hub portion. The spacer includes an outer peripheral cylindrical flange extending in coplanar relationship with the cylindrical flange portions of the hub member so as to collectively form an overall surface width corresponding to the width of the motion picture film to which the reel is being adapted.

All of the reel components may be readily constructed either of preformed or shaped sheet metal and aluminum material, while the ball bearing structure may be constituted of standard commercial elements which are widely and inexpensively obtained. By utilizing the inventive sheet metal components for the present motion picture film reel structure, the relatively large-diameter reel side discs or flanges which are usually made of heavy gauge steel, may be constructed of light-weight aluminum sheet so as to afford an appreciable reduction in the weight of the entire film reel assembly.

BRIEF DESCRIPTION OF THE DRAWINGS

Reference is now had to the following detailed description of preferred embodiments of a motion picture film reel according to the invention, taken in conjunction with the accompanying drawings, in which:

FIG. 1 is a side elevational view of a motion picture film reel according to the invention;

FIG. 2 is a sectional view along line 2—2 in FIG. 1;

FIG. 3 is a sectional view along line 3—3 in FIG. 2 illustrating the hub structure of the motion picture film reel according to the present invention;

FIG. 4 is a side elevational view, in section, of one of the complementary hub member halves of the motion picture film reel;

FIG. 5 is a side elevational view of the hub illustrated in FIG. 4; and

FIG. 6 is a sectional view of the upper portion of the reel hub structure with a spacer member shown positioned therebetween.

DETAILED DESCRIPTION

Referring now in detail to the drawings, and particularly FIGS. 1 and 2, a motion picture film reel 10 includes a pair of parallel spaced reel flanges or discs 12 and 14 positioned on either side of a film reel hub assembly 16.

Each of the discs or film reel side flanges 12 and 14 is of identical configuration, and in order to provide for a lighter structure may include a plurality of large diameter holes 18 positioned annularly about a central hole or aperture 20. The discs 12 and 14 may be each constructed of sheet-metal or plate steel, or more preferably, of light-weight aluminum.

In the embodiment shown in FIGS. 1 and 2 of the drawings, the motion picture reel hub assembly 16 includes a pair of complementary, left-hand and right-hand mirror-image halves which are joined together at a central line of juncture so as to form an integral and rigidly interconnected structure. Each of the hub assembly halves includes a hub member 22 of essentially dished cylindrical shape having an end wall portion 24 extending into a radially outwardly extending annular flange 26 having a flat plate shape. The radially outermost edge of each flange 26 extends into an annular cylindrical rim portion 28, each having a predetermined axial width so as to form, when assembled together, a cylindrical surface having a width corresponding substantially to the width of the motion picture film strip to be wound onto the reel. A plurality of peripherally spaced apertures 30 are formed through both flanges 26 so as to facilitate their joining together by means of suitable fasteners, such as rivets 32, or other types of fasteners as, for example, bolts or screws.

Attached to the outer or spaced apart surface of each annular flange 26 is an annular inner race or flange 34 of a ball bearing assembly 36. Each ball bearing assembly 36 also includes an outer flange 38 extending in parallel axially spaced relationship with the inner flange 34, each of the ball bearing flanges 34 and 38 representing, respectively, the inner and outer race portions of the bearing structure. The inner flanges 34 of each of the bearing assemblies 36 includes a plurality of throughapertures which are located in alignment with the apertures 30 formed in the respective annular flanges 26 of the hub assembly 16, and are adapted to have the fasteners 32 extend therethrough so as to position the two halves of the hub assembly and the two ball bearing assemblies 36 into rigidly interconnected relationship.

Similarly, each of the outer flanges 38 of the bearing assemblies 36 is provided with a plurality of apertures 40 adapted to be aligned with a similar array of apertures 42 which are formed through each of the side discs 12 and 14 of the motion picture film reel 10. Suitable fasteners 44, such as for example, rivets, bolts or screws and the like, are positioned so as to extend through the aligned apertures 40 and 42 to thereby fixedly interconnect the respective side discs 12 and 14 with each of the outer bearing flanges 38.

Inasmuch as the ball bearing flanges 34 and 38 are rotatable relative to each other, this permits relative free rotation between side disc 12 and the hub assembly 16, between side disc 14 and hub assembly 16, and between the discs 12 and 14 themselves, so as to render the discs essentially free-wheeling.

In order to facilitate the fastening together of flanges 26 of hub assembly 16 and the inner flanges 34 of the ball bearing assembly 36 by means of fasteners 32, as shown in FIG. 3 of the drawings, the flanges 34 and 38, or at least flanges 38, may be preferably formed of rectangular configuration, whereby by angularly offsetting the flanges 34 and 38 relative to each other, access may be provided past the outer flange 38 of the ball bearing assembly 36 to the apertures 30 extending through the axially inner flange portions 26 and 34 so as to permit fastening these togethr upon suitable alignment of their apertures. Similarly, the relatively large annularly spaced holes 18 in each of the side disc 12 and 14 may be located to facilitate access interiorly of ball bearing assembly flange 38, to thereby permit manipulation of the fastener means from interiorly of the hub assembly.

As shown in FIGS. 4 and 5 of the drawings, each half of the hub assembly 16 includes the hub portion 22, annular flange portion 26 and outer cylindrical rim portion 28, each having a plurality of the annularly spaced apertures 30 for receiving the fasteners 32. The central hub portion 22 which includes the flat end wall 24 is also provided with a suitable central aperture 46 which may have a key hole shape so as to facilitate the connection thereto of a suitable reel drive spindle (not shown). Furthermore, a radial slot 48 may be cut through the rims 28 and at least the outer portions of the annular flanges 26 so as to, upon joining together the complementary halves of the hub assembly 16, provide a transversely extending radial slot which will facilitate the insertion therein of the end of a film strip being wound about the periphery of cylindrical rim portions 28. The two complementary hub assembly portions are of course joined together so that the slots 48 in each hub half are in radial alignment.

As may be readily ascertained, the hub assembly halves, as shown in FIGS. 4 and 5 may be inexpensively formed of stamped sheet-metal members by means of suitable stamping or punch dies, which will require practically no extensive finishing operation after the forming of the hub assembly components. Since both left and right-hand portions of the hub assembly 16 are identical to each other, the same die may be employed for forming both halves of the hub.

When it is desired to utilize the film reel for film stripss of different width, possibly 35 mm film rather than 16 mm, then a spacer, as shown in detail in FIG. 6 of the drawing may be inserted. The spacer illustrated in FIG. 6 of the drawings may, for example, have the configuration of a shallow dished member 50 including an annular flange portion 52 extending into a radially outer cylindrical rim 54 which has the identical diameter with the outer rims 28 of each of the hub assembly halves. Suitable apertures 56 are provided in the annular flange 52, adapted to be aligned with the apertures 30 in flanges 26 and the ball bearing assembly inner flanges 34. Furthermore, if desired, in order to impart further rigidity to the entire assembly, a suitable spacer bushing 60 may be positioned about each of the fasteners 32 extending through the apertures. By imparting a predetermined axial width to the rim 54, the combined cylindrical surface widths of rims 28 and 54 may be adjusted so as to conform to the type of film being wound upon the motion picture film reel 10.

Although the flange 38 has been illustrated as being essentially rectangular in configuration in order to facilitate access to the inner flanges 34 of the ball bearing assembly 36, the outer flange 38 may be essentially disc-shaped configuration, having a smaller outer radial dimension than that of inner flanges 34.

From the foregoing, it readily appears that all of the components of the film reel structure may be formed of relatively simple and inexpensive elements, which are readily assembled through suitable fasteners and may be adjusted so as to conform to the type and width of motion picture film strip being wound upon the reel.

While there has been shown what is considered to be the preferred embodiment of the invention, it will be obvious that modifications may be made which come within the scope of the disclosure of the specification.

What I claim is:

1. A motion picture film take-up reel comprising:
   a. a rotatably drivable hub member including a central hub portion formed of a pair of complementary halves and being adapted to receive a take-up reel drive spindle of a motion picture projector and form a driving connection therewith; radially extending peripheral flange means extending from said hub portion; cylindrical film-receiving surface means formed at the radially outer end of said flange means upon which said film is adapted to be wound; said pair of complementary halves centrally divided in a radially extending plane, each said half including a half-thickness portion of said peripheral flange means in contiguous surface-to-surface relationship, and fasstener means interconnecting said flange means for fastening together said complementary halves;
   b. roller bearing means having first and second races, each including parallel radially extending side wall portions rotatable relative to each about a common axis, one each of said roller bearing means being positioned on each side of said flange means and with the central hub portion extending through a center aperture formed in each of said roller bearing means, further fastener means for fastening the side wall portions of each of said roller bearing means adjacent said flange means to said flange means; and
   c. a pair of disc-shaped centrally-apertured planar flanges of light-weight material having the radially inner peripheral portion thereof positioned adjacent the axially outer side wall portions of each of said roller bearing means, said planar flanges being rigidly fastened to said side wall portions and being spaced apart a distance slightly greater than the width of the film to be wound on the cylindrical film-receiving surface means, said planar flanges being freely rotatable relative to said hub member and each other.

2. A film take-up reel as claimed in claim 1, comprising a plurality of radially aligned, peripherally spaced apertures being formed in said peripheral flange means and in each of the bearing means side wall portions adjacent thereto; said further fastener means extending through said aligned apertures so as to rigidly fasten said side wall portions to said flange means.

3. A film take-up reel as claimed in claim 1, comprising a plurality of radially aligned, peripherally spaced apertures being formed in said planar flanges and in each of the bearing means side wall portions adjacent thereto; said further fastener means extending through said aligned apertures so as to rigidly fasten said side wall portions to said planar flanges.

4. A film take-up reel as claimed in claim 1, at least the side wall portions of said roller bearing means fastened to said planar flanges being substantially rectangular in configuration.

5. A film take-up reel as claimed in claim 1, each of said hub member halves being formed of a shaped, formed sheet metal member.

6. A film take-up reel as claimed in claim 1, comprising annular spacer means adapted to be positioned intermediate said peripheral flange means portions and having an outer peripheral cylindrical surface coextensive with cylindrical film-receiving surface means; and a plurality of apertures being formed in said spacer means in alignment with the apertures in said side wall portions and in said flange means, said fastener means for connecting said side wall portions and said flange means extending through the apertures in said spacer means for rigidly fastening the latter to said side wall portions and to said flange means so as to form a unitary hub member, said spacer means structure adapted to receive a wider film on said take-up reel.

7. A film take-up reel as claimed in claim 1, said hub member hub portion, peripheral flange means and cylindrical film-receiving surface means being integrally formed.

8. A film take-up reel as claimed in claim 7, said hub member comprising a formed sheet metal member.

* * * * *